(12) United States Patent
Kwon et al.

(10) Patent No.: US 7,302,008 B2
(45) Date of Patent: Nov. 27, 2007

(54) APPARATUS AND METHOD FOR EFFICIENTLY DISTRIBUTING ENERGY OVER A PACKET DATA CHANNEL IN A MOBILE COMMUNICATION SYSTEM FOR HIGH RATE PACKET TRANSMISSION

(75) Inventors: Hwan-Joon Kwon, Seoul (KR); Ho-Kyu Choi, Songnam-shi (KR); Youn-Sun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/516,189

(22) Filed: Sep. 6, 2006

(65) Prior Publication Data

US 2007/0002936 A1  Jan. 4, 2007

Related U.S. Application Data

(62) Division of application No. 10/112,401, filed on Mar. 29, 2002, now Pat. No. 7,180,953.

(30) Foreign Application Priority Data

| Mar. 30, 2001 | (KR) | ................................ 2001-16917 |
| Apr. 18, 2001 | (KR) | ................................ 2001-20639 |
| Jun. 8, 2001 | (KR) | ................................ 2001-32176 |

(51) Int. Cl.
*H04L 5/12* (2006.01)
(52) U.S. Cl. ...................... 375/262; 375/265; 714/755; 714/758; 714/792; 714/794
(58) Field of Classification Search ........ 375/140–142, 375/147, 150, 262, 340, 341, 343; 714/755, 714/758, 776, 786, 792, 795; 370/474, 476, 370/479, 441, 342, 320
See application file for complete search history.

(56) References Cited

U.S. PATENT DOCUMENTS

| 5,983,383 | A  | * | 11/1999 | Wolf ............................ 714/755 |
| 6,530,059 | B1 | * | 3/2003 | Crozier et al. .............. 714/786 |
| 6,615,385 | B1 | * | 9/2003 | Kim et al. ................... 714/758 |
| 6,621,871 | B2 | * | 9/2003 | Ross et al. ................... 375/262 |
| 6,983,412 | B2 | * | 1/2006 | Fukumasa .................... 714/755 |
| 7,050,410 | B1 | * | 5/2006 | Kim et al. ................... 370/335 |

OTHER PUBLICATIONS

Miyoshi et al., Transmitter, Receiver, And Communication Method, Jan. 16, 2003.*

Buckley et al., Turbo Code Based Incremental Redundancy, Aug. 21, 2003.*

* cited by examiner

*Primary Examiner*—Dac V. Ha
(74) *Attorney, Agent, or Firm*—The Farrell Law Firm

(57) ABSTRACT

An apparatus and method for efficiently distributing energy to a packet data channel. A turbo encoder generates a sequence of systematic symbols and a sequence of parity symbols by encoding an information bit stream. An interleaver interleaves the systematic symbol sequence and the parity symbol sequence, separately and serially concatenates the interleaved systematic symbol sequence and the interleaved parity symbol sequence. An energy distributor rearranges the concatenated symbols so that the systematic symbols are disposed in a high energy-having portion of a predetermined transmission period when transmission energy varies for the transmission period. A modulator modulates the rearranged symbols.

4 Claims, 17 Drawing Sheets

APPARATUS AND METHOD FOR EFFICIENTLY DISTRIBUTING ENERGY OVER A PACKET DATA CHANNEL IN A MOBILE COMMUNICATION SYSTEM FOR HIGH RATE PACKET TRANSMISSION

PRIORITY

This application is a Divisional Application of U.S. patent application Ser. No. 10/112,401, filed Mar. 29, 2002, now U.S. Pat. No. 7,180,953 which claims priority to an application entitled "Apparatus and Method for Efficiently Distributing Energy over Packet Data Channel in Mobile Communication System for High Rate Packet Transmission" filed in the Korean Industrial Property Office on Mar. 30, 2001 and assigned Serial No. 2001-16917, an application entitled "Apparatus and Method for Efficiently Distributing Energy over Packet Data Channel in Mobile Communication System for High Rate Packet Transmission" filed in the Korean Industrial Property Office on Apr. 18, 2001 and assigned Serial No. 2001-20639, and an application entitled "Apparatus and Method for Efficiently Distributing Energy over Packet Data Channel in Mobile Communication System for High Rate Packet Transmission" filed in the Korean Industrial Property Office on Jun. 8, 2001 and assigned Serial No. 2001-32176, the contents of all of which are hereby incorporated by reference.

BACKGROUND OF THE INVENTION

1. Field of the Invention

The present invention relates generally to a communication apparatus and method in a high rate packet transmission mobile communication system, and in particular, to an apparatus and method for efficiently distributing energy to symbols transmitted on a packet data channel. More particularly, the present invention relates to an apparatus and method for changing the sequence of symbols on a packet data channel so that more energy is assigned to symbols (or bits) highly influential in data reception performance to thereby achieve efficient packet data transmission, when energy (or power) is variably assigned to the packet data channel in a mobile communication system for high rate packet transmission.

2. Description of the Related Art

In general, a high rate packet transmission mobile communication system provides a high rate data service via a packet data channel (PDCH) as used in 1×EVDO or 1×EVDV. The PDCH is shared among a plurality of users in time division multiplexing (TDM). A sub-packet is a transmission unit of each TDM user data and transmitted in one or more slots.

A preamble channel (or a packet data control channel: PDCCH) transmits control information about the TDM data transmitted on the PDCH at a particular time point. From the control information, the users obtain information about the destination, length, data rate, modulation, etc. of the transmitted data on the PDCH.

The control information about the packet data includes sub-packet length, MAC (Medium Access Control) ID, data rate, modulation, payload length, sub-packet ID (SPID), and ARQ (Automatic Repeat Request) channel ID. As stated before, a transmission unit of data transmitted on a PDCH is defined as a sub-packet, and the length of a sub-packet is the temporal length of TDM data transmitted on the PDCH. The sub-packet length must be notified beforehand in a system having a variable data length. A MAC ID is a user identifier and is assigned to each user in a system access state. A data rate refers to the transmission rate of data having one sub-packet length. Modulation information represents a modulation scheme by which the transmission data has been modulated, such as QPSK, 8PSK, 16QAM, and 64QAM. Payload length is the number of information bits in one sub-packet. An SPID is a sub-packet identifier used to support retransmission. An ARQ channel ID identifies a parallel transmission channel in order to support successive data transmission to one user.

Two bits are assigned to each of sub-packet length, payload length, SPID, and ARQ channel ID, and six bits are assigned to MAC ID. Data rate and modulation are determined according to the 2-bit sub-packet length, the 2-bit payload length, and the number of Walsh functions available to the PDCH. The Walsh function information is received on a different channel. Each mobile station (MS), which receives a high rate packet data service, is assigned a MAC ID at its system access and receives a PDCCH. The MS demodulates the PDCCH and determines whether the current packet is destined for the MS from the MAC ID set in the PDCCH. If the packet is destined for the MS, the MS demodulates a received PDCH using the control information acquired from the demodulated PDCCH. The data rate and modulation method of the received sub-packet can be detected from information about sub-packet length, payload length, and the number of Walsh functions available to the PDCH.

The high-rate packet transmission mobile communication system transmits packet data control information on two PDCCHs, namely, a primary PDCCH (PPDCCH) and a secondary PDCCH (SPDCCH). The PPDCCH transmits sub-packet length information in one slot all the time, and the SPDCCH transmits information about payload length, SPID, ARQ channel ID, and MAC ID in one, two, or four slots.

These PDCCHs are transmitted in code division multiplexing (CDM) with a PDCH. That is, the PPDCCH, the SPDCCH and the PDCH are transmitted using different codes assigned to them at the same time.

FIG. 1 illustrates the relation between transmission power and time for the PPDCCH, the SPDCCH, and the PDCH in the high-rate packet data transmission mobile communication system.

Referring to FIG. 1, reference numerals 101, 102 and 103 denote the PPDCCH, the SPDCCH and the PDCH, respectively. Reference numeral 113 indicates that the channels are transmitted on a slot basis. Time is defined along the horizontal axis and the energy assigned to each channel is defined along the vertical axis in FIG. 1. Reference numerals 104 to 107 denote a one slot-sub-packet transmission, a two slot-sub-packet transmission, a four slot-sub-packet transmission, and an eight slot-sub-packet transmission, respectively. The PPDCCH 101 is always transmitted in the first slot of each packet data transmission period. For the packet data transmission periods of one, two, four, and eight slots, the SPDCCH 102 is transmitted in the first one, two, four, and four slots, respectively. Reference numeral 108 denotes transmission power available to a base station (BS). Reference numerals 109 to 112 denote PDCHs transmitted in one, two, four, and eight slots. The remaining power from the overall available transmission power of the BS minus the sum of transmission powers assigned to the PPDCCH 101 and the SPDCCH 102 is available to the PDCH 103.

In the case of the PDCH 109 transmitted in one slot, the PPDCCH 101 and the SPDCCH 102 are transmitted contemporaneously over the whole PDCH transmission period.

Thus, the transmission power of the BS does not change. On the contrary, in the cases of the PDCHs 110, 111 and 112 transmitted in two or more slots, the power assigned to the PDCHs changes on a slot basis during sub-packet transmission because the PPDCCH 101, the SPDCCH 102, and the PDCH 103 differ in transmission duration.

FIG. 2 is a block diagram of a forward transmitter for transmitting a forward PDCH (F-PDCH) in a conventional high-rate packet data transmission mobile communication system.

Referring to FIG. 2, an encoder 201 encodes an information bit stream of a PDCH and outputs code symbols. A scrambling code generator 202 generates a scrambling code by which the packet data is to be scrambled. A scrambler 203 scrambles the code symbols with the scrambling code. A channel interleaver 204 interleaves the scrambled symbols according to a predetermined interleaving rule. A puncturer 205 punctures the interleaver output in a predetermined puncturing pattern. A modulator 206 modulates the output of the puncturer 205. A symbol demultiplexer (DEMUX) 207 demultiplexes the modulated symbols according to the number of sub-channels. A 32-chip Walsh cover 208 spreads the output of the symbol DEMUX 207 with a predetermined Walsh code of length 32. A gain controller 209 adjusts the gain of the Walsh cover output. A Walsh chip level summer 210 sums the output of the gain controller 209 at a chip level.

The encoder 201 is a turbo encoder. Turbo-coded symbols include systematic symbols and parity symbols. In the nature of turbo coding, reception performance of systematic symbols significantly influences overall throughput relative to parity symbols. That is why when turbo coding is used for channel coding and the transmission energy of a PDCH is variable as illustrated in FIG. 1, data throughput depends on the positions of systematic symbols in a transmission period, that is, energy assigned to the systematic symbols.

FIG. 3 illustrates an exemplary disposition of systematic symbols output from the puncturer 205 illustrated in FIG. 2. Referring to FIG. 3, reference numerals 301 to 304 denote a one-slot PDCH transmission, a two-slot PDCH transmission, a four-slot PDCH transmission, and an eight-slot PDCH transmission, respectively. As stated before in connection with FIG. 1, power assigned to the PDCH varies on a slot basis. Reference numeral 305 denotes the positions of the systematic symbols in each sub-packet transmission period. As illustrated in FIG. 3, the systematic symbols are concentrated on a starting portion having the lowest power in each sub-packet transmission period.

FIG. 4 illustrates another exemplary disposition of systematic symbols output from the puncturer 205 illustrated in FIG. 2. In FIG. 4, the systematic symbol disposition occurs when the turbo-coded symbols are repeated according to a predetermined repetition factor. A sequence repeater (not shown) for repeating the sequence of code symbols can be configured between the channel interleaver 204 and the puncturer 205 in the transmitter of FIG. 2, by way of example.

Referring to FIG. 4, reference numerals 401 to 404 denote a one-slot PDCH transmission, a two-slot PDCH transmission, a four-slot PDCH transmission, and an eight-slot PDCH transmission, respectively. As stated before in connection with FIG. 1, power assigned to the PDCH varies on a slot basis. Reference numeral 405 denotes the positions of systematic symbols in each sub-packet transmission period. As illustrated in FIG. 4, the systematic symbols are distributed evenly across each sub-packet transmission period.

The above-described systematic symbol dispositions illustrated in FIGS. 3 and 4 adversely affect reception performance in the nature of turbo coding.

SUMMARY OF THE INVENTION

It is, therefore, an object of the present invention to provide an apparatus and method for changing the sequence of symbols prior to transmission so that more energy is assigned to more significant symbols (or bits) for data reception performance, when the transmission energy of packet data varies for its transmission period in a high-rate packet transmission mobile communication system.

The above and other objects of the present invention are achieved by providing an apparatus and method for efficiently distributing energy over a PDCH. A turbo encoder generates a sequence of systematic symbols and a sequence of parity symbols by encoding an information bit stream. An interleaver interleaves the systematic symbol sequence and the parity symbol sequence, separately and serially concatenates the interleaved systematic symbol sequence and the interleaved parity symbol sequence. An energy distributor rearranges the concatenated symbols so that the systematic symbols are disposed in a high energy-having portion of a predetermined transmission period when transmission energy varies for the transmission period. A modulator modulates the rearranged symbols.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

A preferred embodiment of the present invention will be described hereinbelow with reference to the accompanying drawings. In the following description, well-known functions or constructions are not described in detail since they would obscure the invention in unnecessary detail.

It is to be appreciated in the following description that specific Walsh function length, Walsh function number, interleaving rule, modulation, and repetition factor are offered for better understanding of the present invention and so they are merely exemplary. A forward link refers to a link directed from a BS to an MS and a reverse link refers to a link directed from a MS to a BS hereinbelow.

Figure 5:
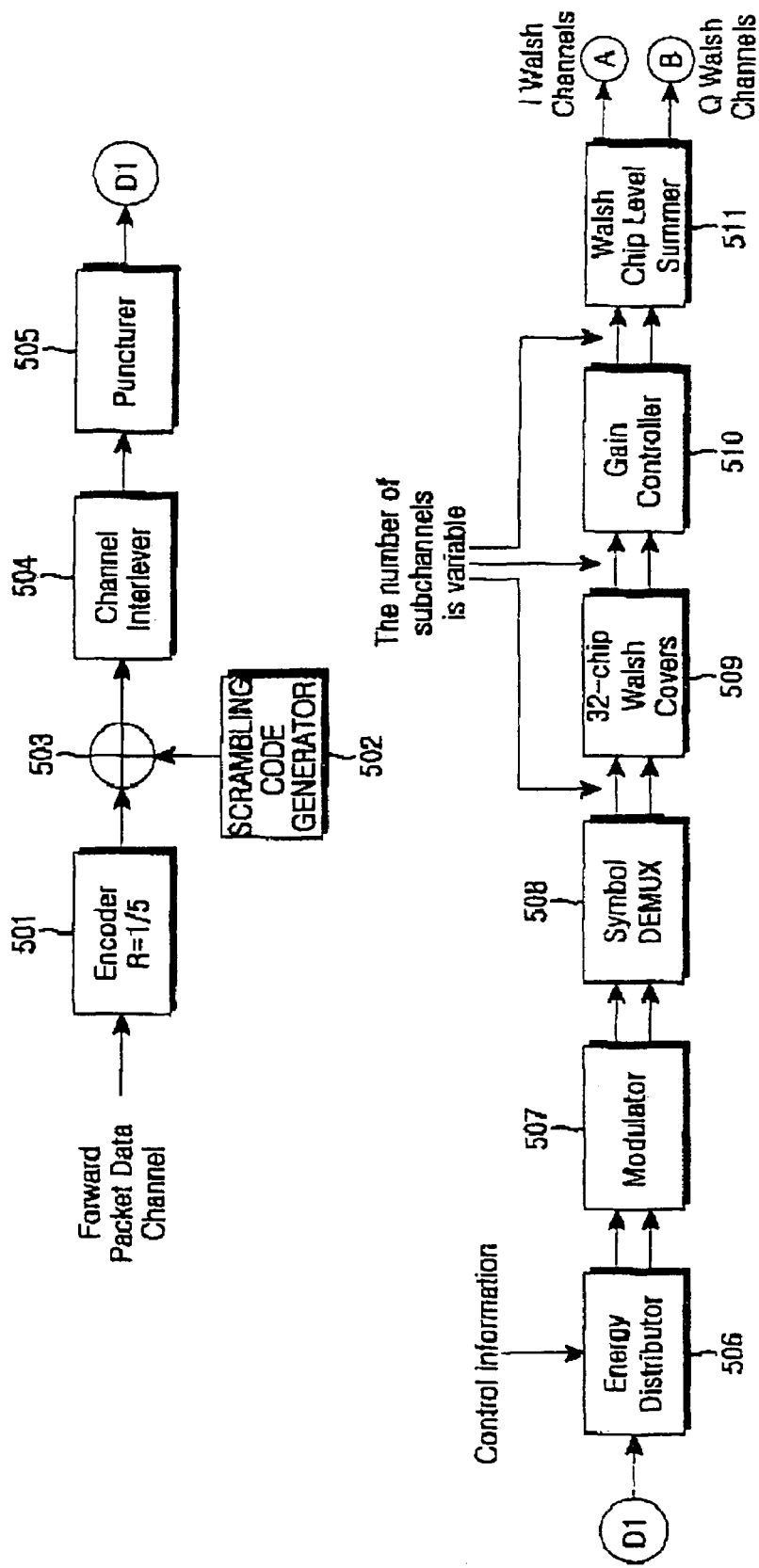
FIG. 5 is a block diagram of a forward transmitter for transmitting an F-PDCH in a high-rate packet data transmission mobile communication system according to an embodiment of the present invention.

FIG. 5 is a block diagram of a forward transmitter for transmitting an F-PDCH in a high-rate packet data transmission mobile communication system according to an embodiment of the present invention. Referring to FIG. 5, an encoder 501 encodes input information bits of a F-PDCH and outputs code symbols. The encoder 501 is a turbo encoder that encodes the input information bits and outputs a sequence of systematic symbols and parity symbols. A scrambling code generator 502 generates a scrambling code by which the packet data is to be scrambled. A scrambler 503 scrambles the code symbols received from the encoder 501 with the scrambling code.

A channel interleaver 504 interleaves the scrambled symbols in a predetermined interleaving rule. Specifically, the channel interleaver 504 interleaves a sequence of systematic symbols and a sequence of parity symbols separately and serially concatenates the interleaved symbol sequences. When a code rate ⅕ turbo encoder is used, for example, the channel interleaver 504 interleaves a sequence of systematic symbols (X) and a sequence of four kinds of parity symbols (Y0, Y0', Y1, and Y1') and serially concatenates the interleaved sequences. Y0 and Y01 represent sequences of parity symbols generated from a first constituent encoder and Y1 and Y1' represent sequences of parity symbols generated from a second constituent encoder in the turbo encoder. The puncturer 505 punctures only parity symbols of the interleaver output in a predetermined puncturing pattern in order to match a target data rate. As described before, a sequence repeater (not shown) can be disposed between the channel interleaver 504 and the puncturer 505 to repeat a sequence of code symbols according to a predetermined repetition factor. The puncturer 505 and the sequence repeater collectively form a data rate matching block for generating a code at a given data rate.

An energy distributor 506 changes the sequence of the symbols received from the puncturer 505 based on control information about sub-packet length, modulation (e.g., QPSK, 8PSK, or 16QAM), the number of Walsh functions available to the PDCH, and a repetition factor for a sequence of code symbols, so that systematic symbols are disposed in a high energy portion of a sub-packet transmission period. The energy distributor 506 may be implemented as a physically separate device, or within the puncturer 505. In other words, the puncturer 505 can be so configured as to co-function as the energy distributor according to the present invention. However, the following description is made in the context that the puncturer 505 and the energy distributor 506 are two different function blocks.

A modulator 507 modulates the rearranged symbols. A symbol DEMUX 508 demultiplexes the modulated symbols according to the number of sub-channels. A 32-chip Walsh cover 509 spreads the output of the symbol DEMUX 508 with a predetermined Walsh code of length 32. A gain controller 510 controls the gain of the output of the Walsh cover 509. A Walsh chip level summer 511 sums the output of the gain controller 510 at a chip level.

Figure 6A:
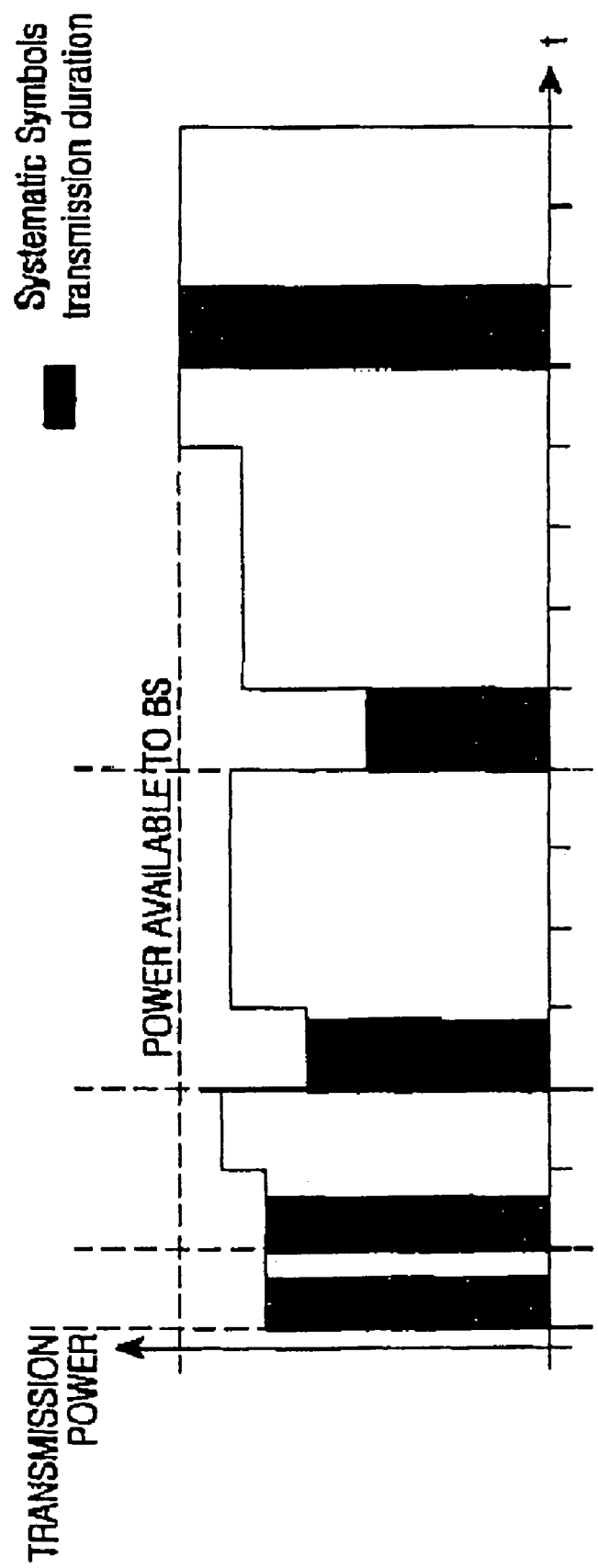
FIGS. 6A and 6B illustrate the dispositions of symbols output from the puncturer illustrated in FIG. 5 according to the embodiment of the present invention.
Figure 6B:
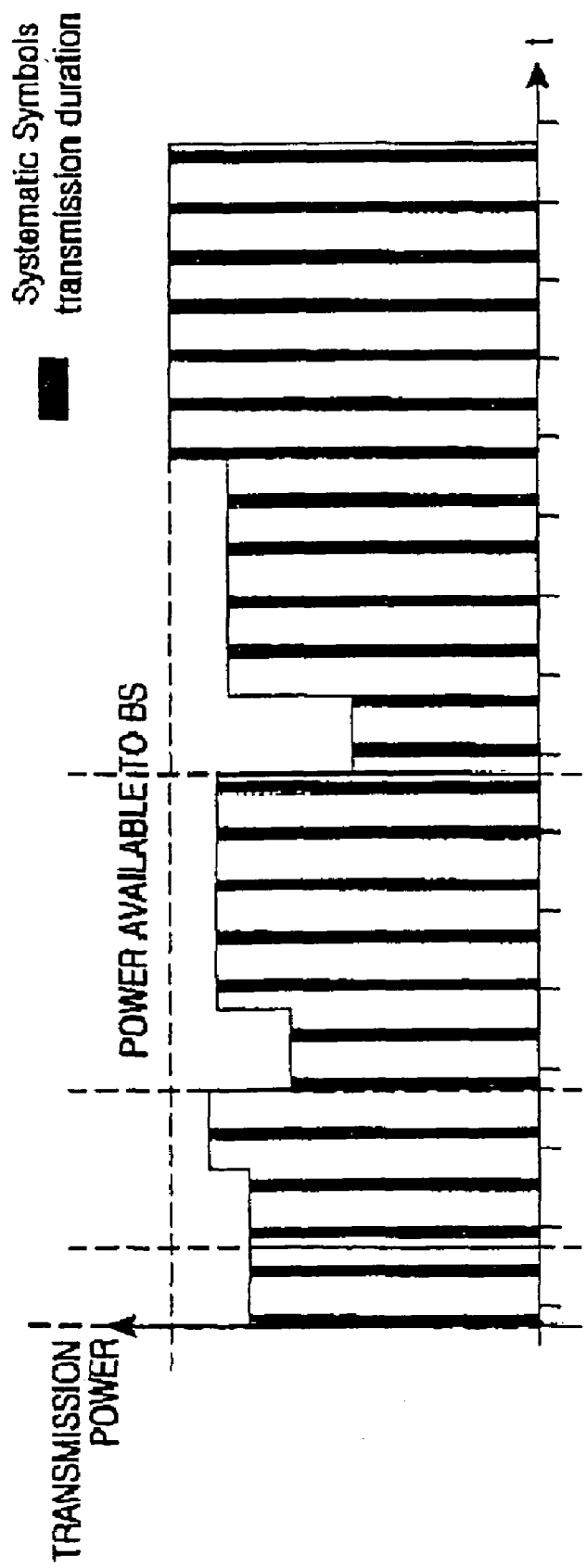
Figure 6C:
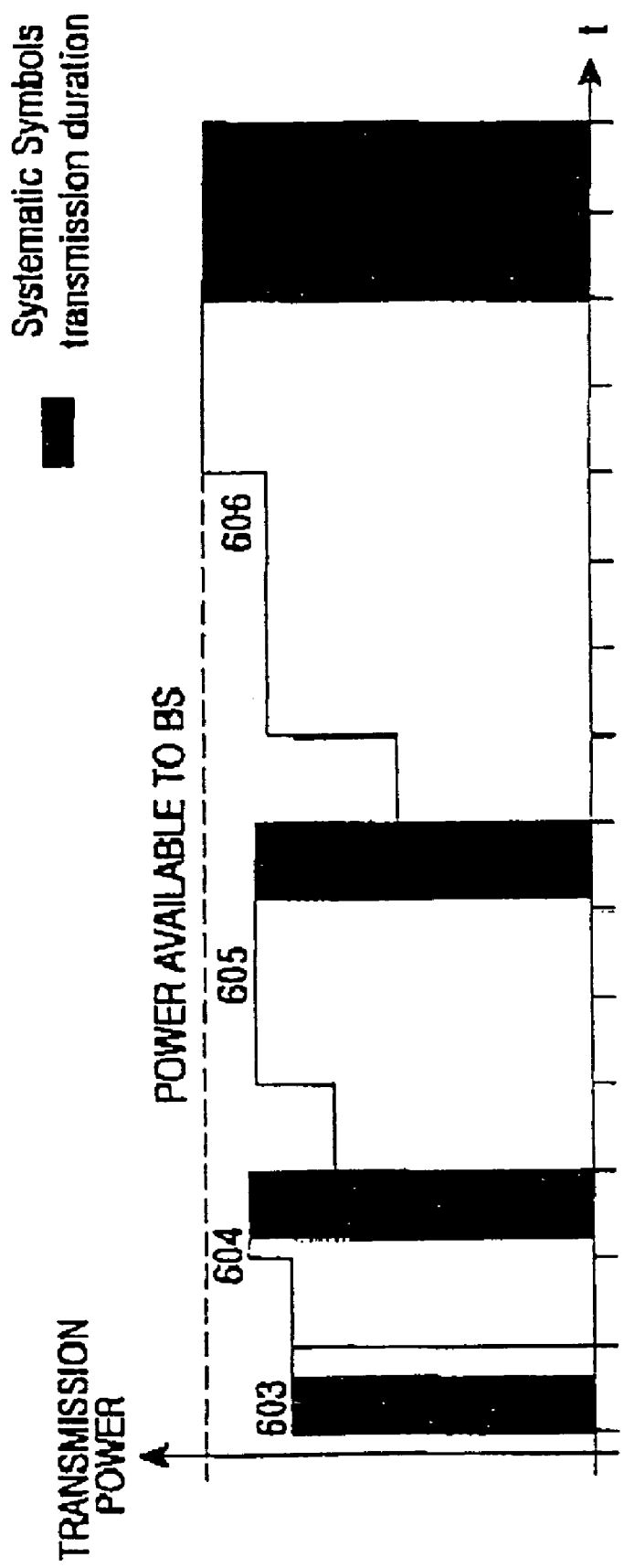
FIG. 6C illustrates the disposition of symbols output from the energy distributor illustrated in FIG. 5 according to the embodiment of the present invention.

FIGS. 6A, 6B and 6C illustrate how the energy distributor 506 changes the sequence of the symbols output from the puncturer 505 before inputting them to the modulator 507. The dispositions of symbols output from the puncturer 505 in FIGS. 6A and 6B are the same as in FIGS. 3 and 4, respectively. As seen from FIG. 6C, the energy distributor 506 disposes systematic symbols in a portion having the highest transmission power of each sub-packet transmission period.

Referring to FIG. 6C, reference numeral 603 denotes a one-slot sub-packet transmission. Transmission power is constant for the sub-packet transmission period, and so it is meaningless to change the sequence of the symbols in a sub-packet. Thus, the symbols of the sub-packet are transmitted in the order of output from the puncturer 505. Reference numeral 604 denotes a two-slot sub-packet transmission. The sequence of symbols is changed so that systematic symbols are disposed in the highest power portion of the sub-packet transmission period, as compared to the corresponding systematic symbol arrangements in FIGS. 6A and 6B. Reference numeral 605 denotes a four-slot sub-packet transmission. The sequence of symbols is changed so that systematic symbols are disposed in the highest power portion of the sub-packet transmission period, as compared to the corresponding systematic symbol arrangements in FIGS. 6A and 6B. Reference numeral 606 denotes an eight-slot sub-packet transmission. The sequence of symbols is changed so that systematic symbols are disposed in the highest BS power portion of the sub-packet transmission period, as compared to the corresponding systematic symbol arrangements in FIGS. 6A and 6B. That is, systematic symbols among turbo-coded symbols are disposed in the highest transmission power portion of a sub-packet transmission period.

Figure 7:
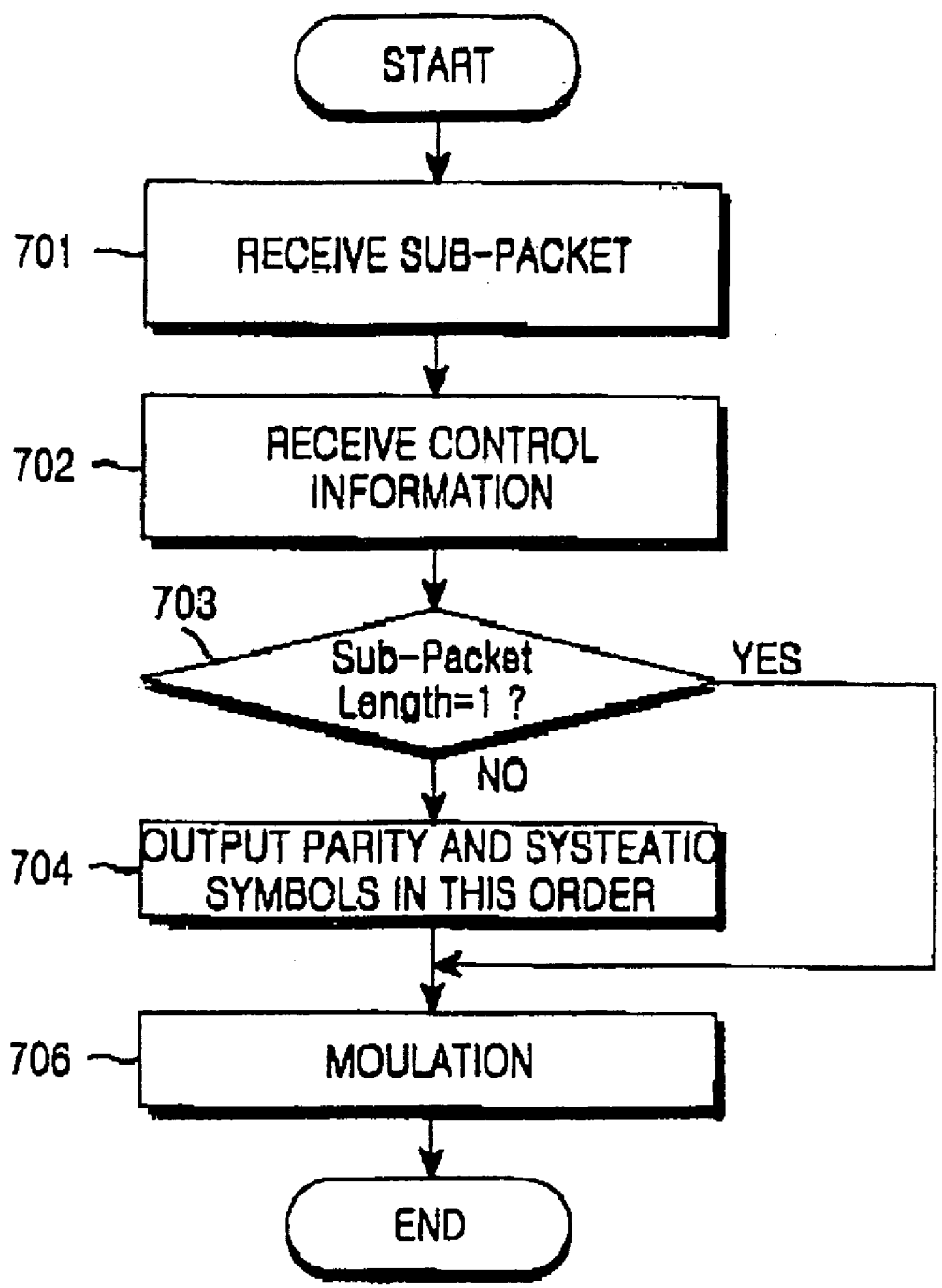
FIG. 7 is a flowchart illustrating the operation of the energy distributor according to the embodiment of the present invention.

FIG. 7 is a flowchart illustrating the operation of the energy distributor 506 illustrated in FIG. 5 according to the embodiment of the present invention. Referring to FIG. 7, the energy distributor 506 receives the code symbols of a sub-packet to be transmitted on a PDCH from the puncturer 505 illustrated in FIG. 5 in step 701. The code symbols are turbo-coded symbols including systematic symbols and parity symbols. In step 702, the energy distributor 506 receives control information about the input sub-packet. The control information may include sub-packet length, payload length, modulation (e.g., QPSK, 8PSK, 16QAM, etc.), the number of Walsh functions available to the PDCH, and a repetition factor for the sequence of code symbols.

The energy distributor 506 determines how many slots the current sub-packet is to occupy for transmission based on the sub-packet length information in step 703. In the case of one-slot transmission, the energy distributor 506 simply passes the code symbols without changing their sequence. In the case of sub-packet transmission in two or more slots, the energy distributor 506 proceeds to step 704.

The energy distributor 506 changes the sequence of the symbols to be input to the modulator 507 based on the received control information in step 704. The sequence of the code symbols is changed by outputting all the parity symbols first and then the systematic symbols to the modulator 507. For the sequence changing, an algorithm illustrated in FIG. 8 can be used. As a result, the parity symbols are disposed in the first part of a sub-packet's transmission period and the systematic symbols, in the second part. As described above, since a sub-packet has more energy assigned to its second part than to its first part, disposition of the systematic symbols in the second part increases data reception throughput (or decoding performance) in a receiving end.

In step 706, the modulator 507 modulates the received symbols. Then, the modulated symbols are complex-spread and converted to an RF (Radio Frequency) signal prior to transmission.

Figure 1:
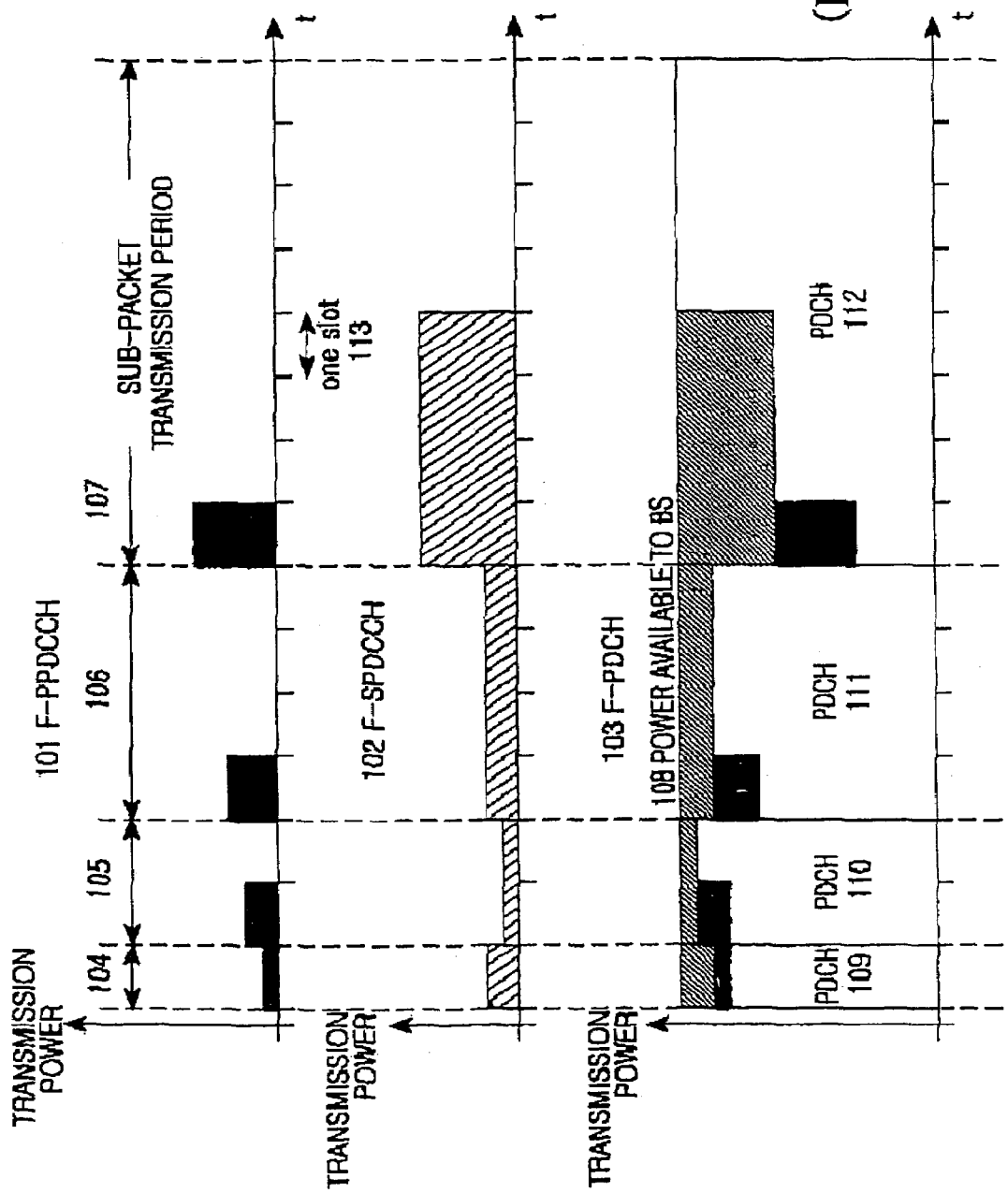
FIG. 1 illustrates the relation between transmission power and time for a PPDCCH, a SPDCCH and a PDCH in a high-rate packet data transmission mobile communication system.
Figure 2:
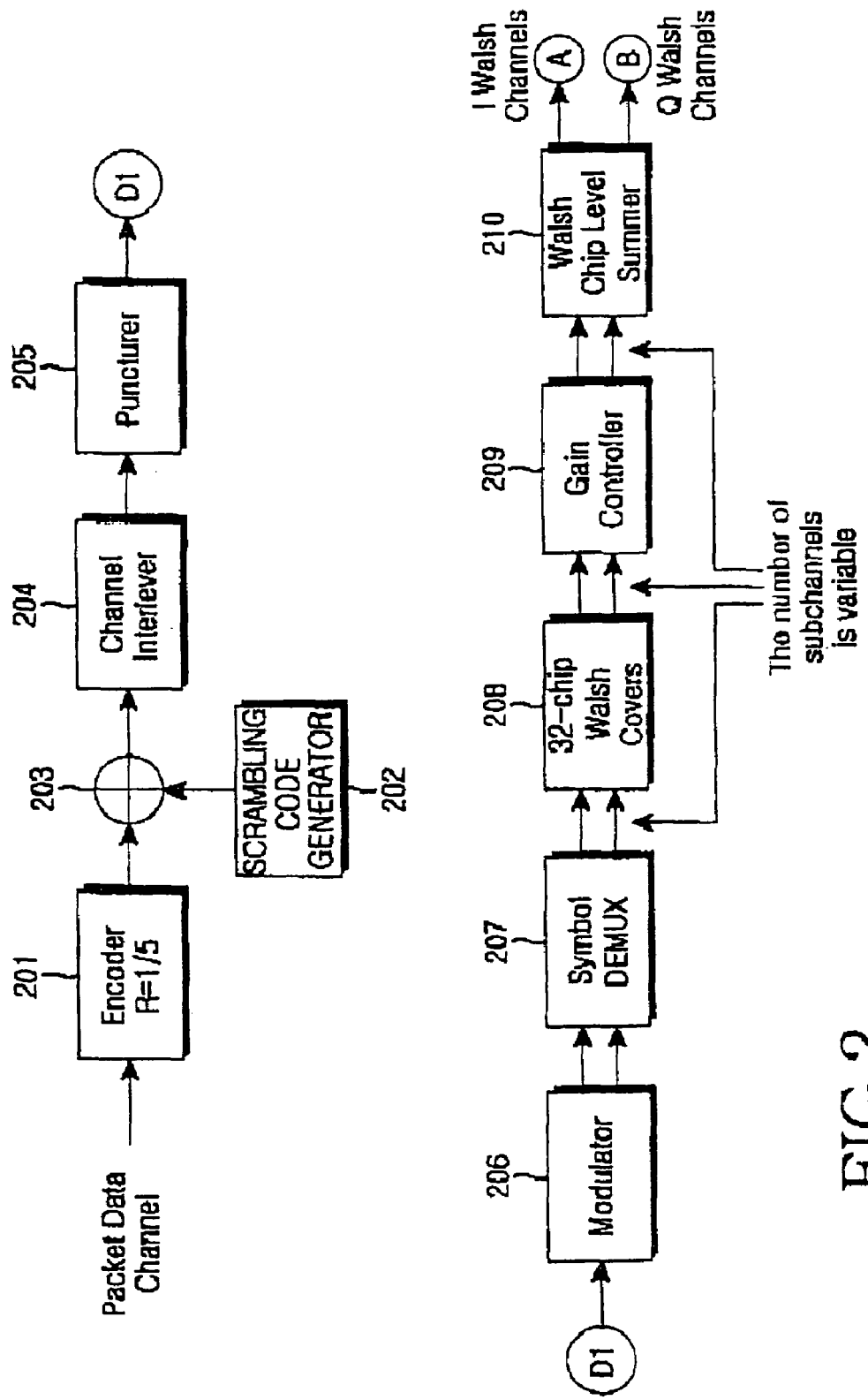
FIG. 2 is a block diagram of a forward transmitter for transmitting a F-PDCH in a conventional high-rate packet data transmission mobile communication system.
Figure 3:
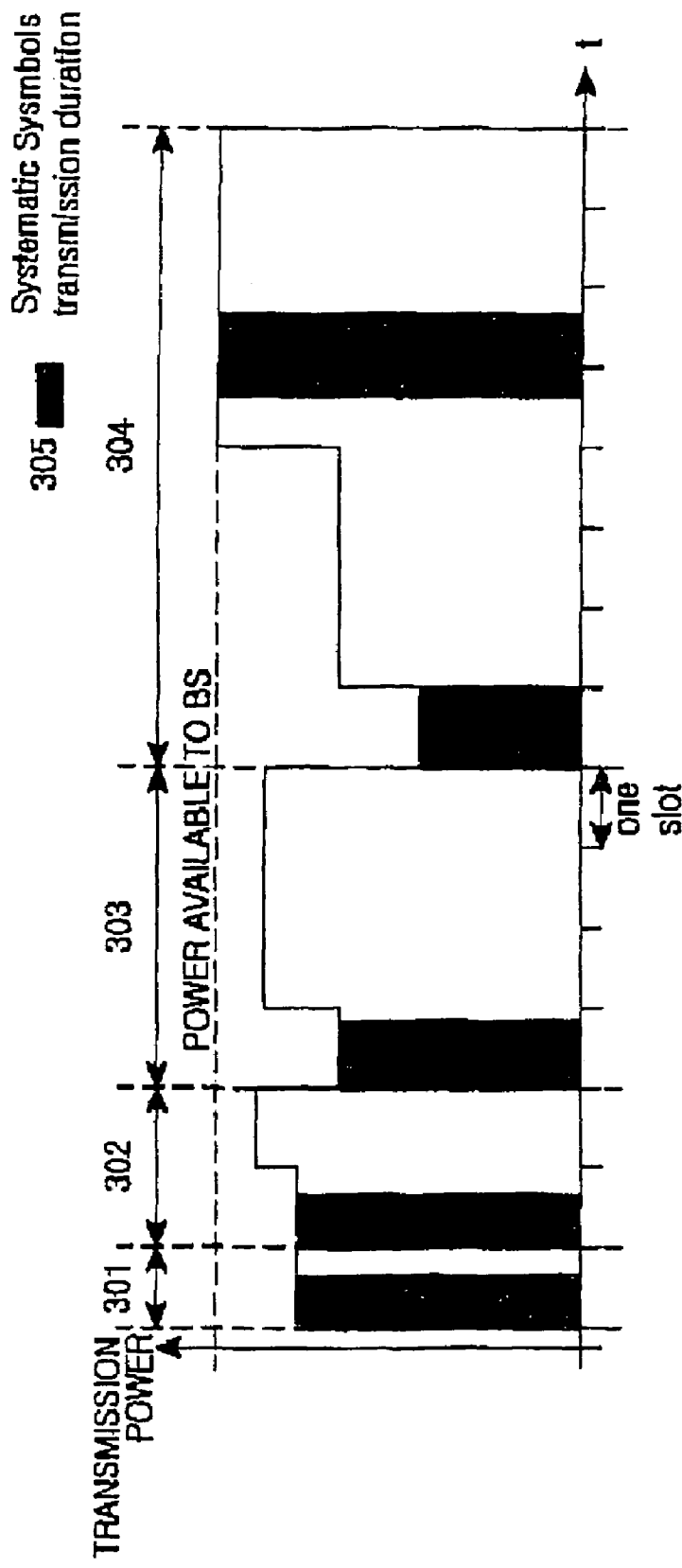
FIG. 3 illustrates an exemplary disposition of systematic symbols output from the puncturer in the transmitter illustrated in FIG. 2.
Figure 4:
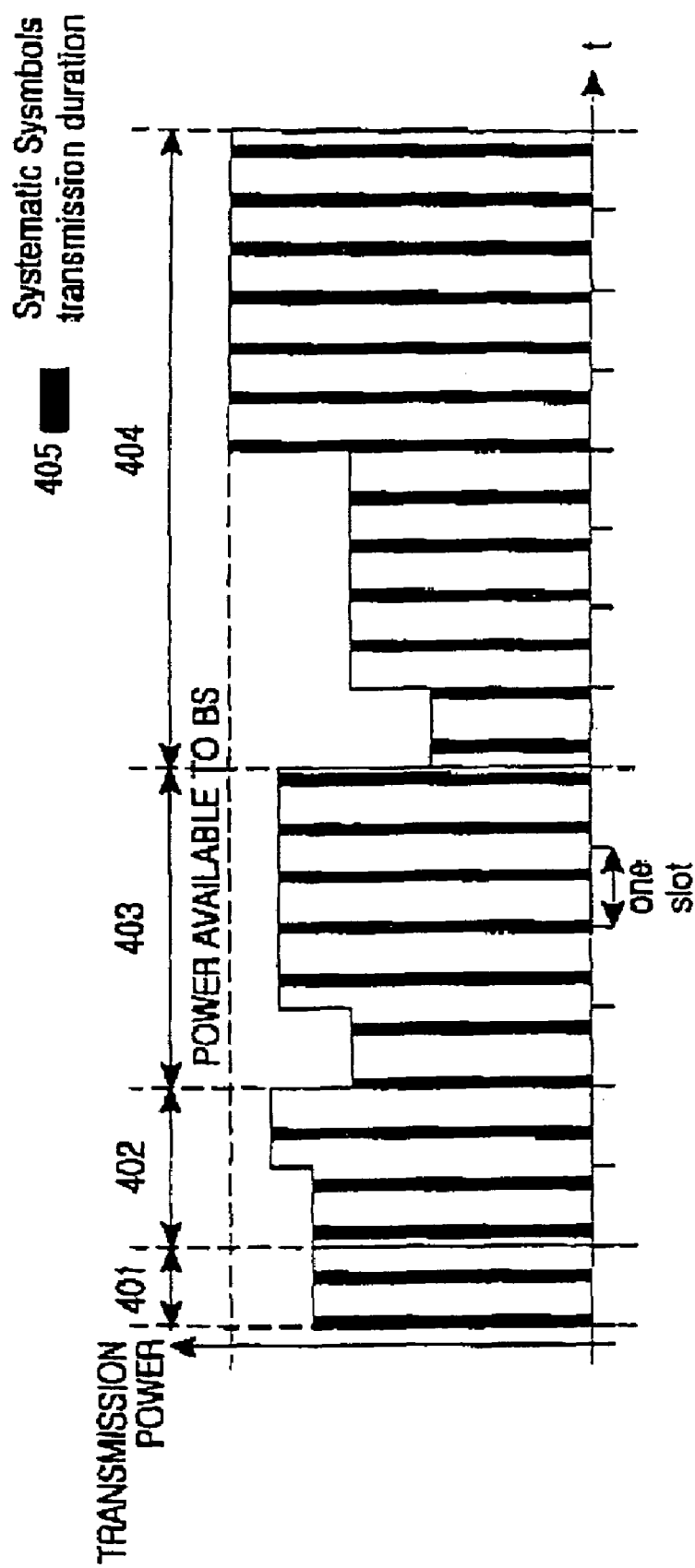
FIG. 4 illustrates another exemplary disposition of systematic symbols output from the puncturer in the transmitter illustrated in FIG. 2.
Figure 8:
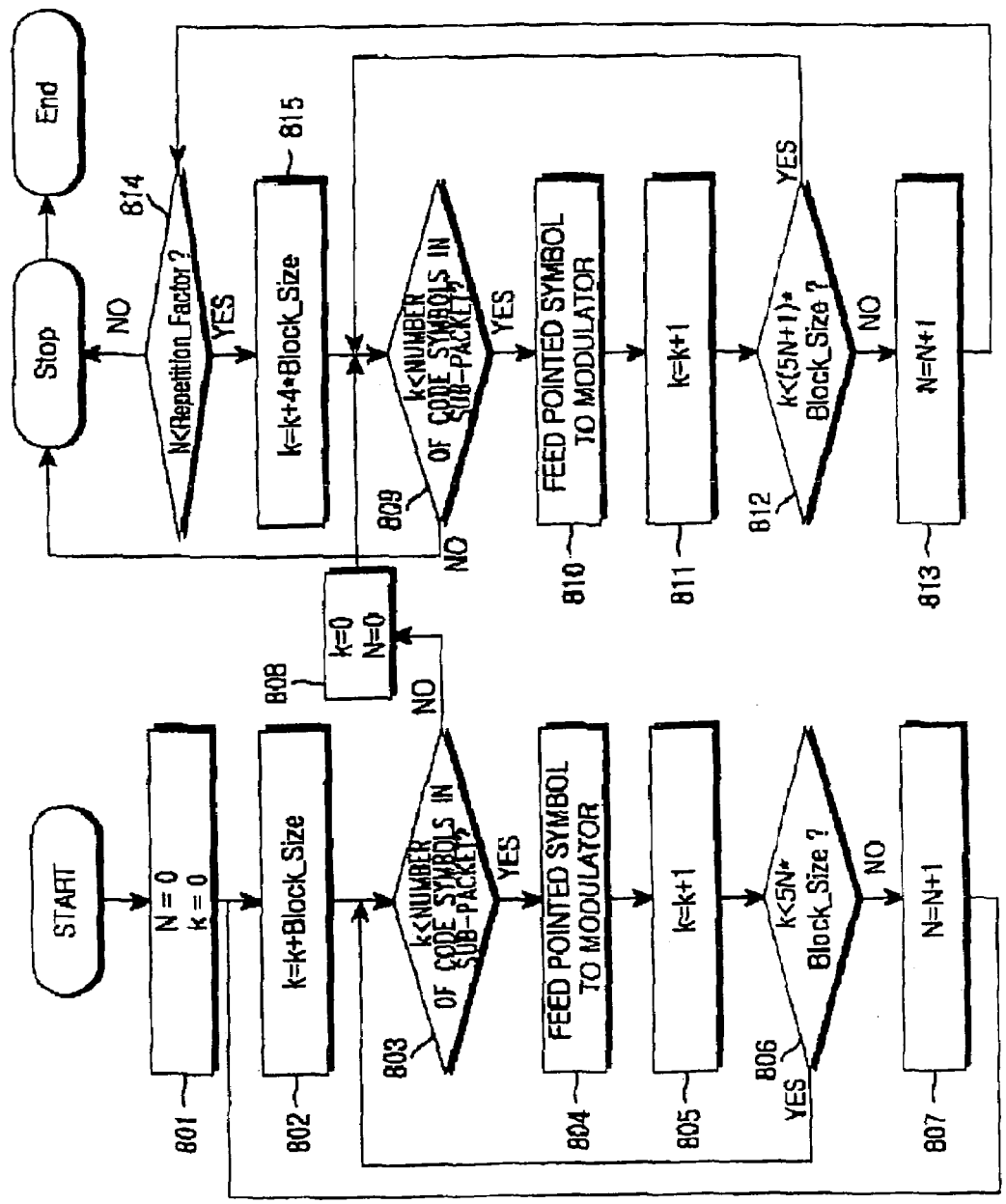
FIG. 8 is a flowchart illustrating a procedure for changing the sequence of symbols to be output to a modulator in the energy distributor according to the embodiment of the present invention.

FIG. 8 is a flowchart illustrating a procedure for changing the sequence of symbols to be input to the modulator 507 in the energy distributor 506 according to the embodiment of the present invention. The algorithm of FIG. 8 is applicable to the code symbols output from the puncturer 505 illustrated in FIG. 5 when they are distributed as illustrated in FIG. 4. The sequence of the code symbols disposed as illustrated in FIG. 3 or in any other pattern can also be adjusted according to a predetermined systematic symbol disposition rule.

Variables used in the algorithm of FIG. 8 are calculated from the control information received in step 702 of FIG. 7. The number of code symbols in the sub-packet is calculated by number of sub-packet code symbols=1,536×modulation order×number of Walsh functions available to be PDCH    (1)

Here, QPSK, PSK and 16QAM have modulation orders of 2, 3 and 4, respectively.

A Repetition_Factor in the control information indicates the repetition time of a sequence of code symbols in a mother code (e.g., a code rate ⅕ turbo code). Payload length is the number of information bits in one sub-packet, also called block size (Block_Size). If Repetition_Factor=2, a sequence repeater produces two symbol sequences by repeating the code symbol sequence of the turbo code once. The durations of the code symbol sequences are referred to as first and second sequence repetition periods, sequentially.

Referring to FIG. 8, the energy distributor 506 sets a variable N to its initial value 0 for control of symbol rearrangement in the first sequence repetition period and sets a variable k to its initial value 0 to point the first of the symbols output from the puncturer 505 in step 801. k is a variable used as a pointer indicating the address (or position) of each symbol output from the puncturer 505. Here, 0≦k≦ (the number of sub-packet code symbols−1). If k=0, the first of the code symbols output from the puncturer 505 is pointed, and if k=x, the (x+1)th of the code symbols is pointed. N is a variable indicating a sequence repetition period to which the algorithm of FIG. 8 is applied.

After the variable initialization, the energy distributor 506 updates k to k+Block_Size in step 802, so that the pointer k points the address (or position) of the first parity symbol following systematic symbols in the first sequence repetition period. Block_Size indicates the number of information bits for a sub-packet. In steps 803 through 806, the energy distributor 506 successively outputs the parity symbols in the first sequence repetition period to the modulator 507 by increasing k by one at each time.

Specifically, the energy distributor 506 determines whether the variable k exceeds the number of sub-packet code symbols in step 803 to control the pointer variable k not to exceed the number of the sub-packet code symbols. If the variable k is equal to or less than the number of sub-packet code symbols, the energy distributor 506 outputs the symbol that the variable k points to the modulator 507 in step 804 and increases the variable k by one in step 805. In step 806, the energy distributor 506 determines whether the variable k is less than 5(N+1)×Block_Size. For N=1, step 806 is performed to control the symbol rearrangement in the first sequence repetition period. 5(N+1)×Block_Size represents the number of turbo-coded symbols of a code rate of ⅕ after N-time repetition.

If the variable k points a specific symbol in the first sequence repetition period, that is, the variable k is less than 5(N+1)×Block_Size, the energy distributor 506 returns to step 803. If the variable k is equal to or greater than 5(N+1)×Block_Size, which implies that all the parity symbols in the first sequence repetition period have been fed to the modulator 507, the energy distributor 506 increases the variable N by one in step 807 and returns to step 802 to move to the next sequence repetition period. Then, the energy distributor 506 skips the systematic symbols in the second sequence repetition period in step 802 and feeds the parity symbols of the second sequence repetition period sequentially to the modulator 507 in steps 803 through 806.

The above procedure is repeated by the time the last parity symbol in the last sequence repetition period is fed to the modulator 507. Then, the variable k is equal to or greater than the number of sub-packet code symbols in step 803 and thus the energy distributor 506 feeds the remaining systematic symbols to the modulator 507.

To describe output of the systematic symbols to the modulator 507 specifically, the energy distributor 506 sets the variables k and N to 0s to initiate input of the systematic symbols to the modulator 507. For k=0, the pointer k points the first systematic symbol. In steps 809 through 812, the energy distributor 506 feeds the systematic symbols in the first sequence repetition period sequentially to the modulator 507. That is, the energy distributor 506 feeds the symbol pointed by the pointer k to the modulator 507 in step 810, increases the variable k by one in step 811, and determines whether the pointer k is less than (5N+1)×Block_Size in step 812. For N=0, it is determined whether the pointer k is less than Block_Size, that is, whether the pointer k is less than the number of the systematic symbols in the first sequence repetition period. If the pointer k is less than the number of the systematic symbols in the first sequence repetition period, the energy distributor 506 returns to step 809. The above procedure is repeated by the time all the systematic symbols of the first sequence repetition period are fed to the modulator 507. Then, the energy distributor 506 increases the variable N by one in step 813, thereby moving to the next sequence repetition period.

In step 814, the energy distributor 506 determines whether the increased variable N is less than Repetition_Factor. If the variable N is equal to or greater than Repetition_Factor, the algorithm ends. If the variable N is less than Repetition_Factor, the energy distributor 506 updates the variable k to k+4×Block_Size in step 815 and then feeds the systematic symbols of the second sequence repetition period to the modulator 507 in steps 809 through 812. Step 815 is performed to control the pointer k to point the first systematic symbol in the second sequence repetition period. The reason why 4×Block_Size is added to k is that the number of parity symbols in a code rate ⅕ turbo code is 4×Block_Size. In the present invention, N×Block_Size varies with a mother code rate.

By the time the last symbol of the last sequence repetition period is fed to the modulator 507, the pointer k is equal to or greater than the number of sub-packet code symbols in step 809. Then, the energy distributor 506 ends the algorithm in step 815.

Figure 9:
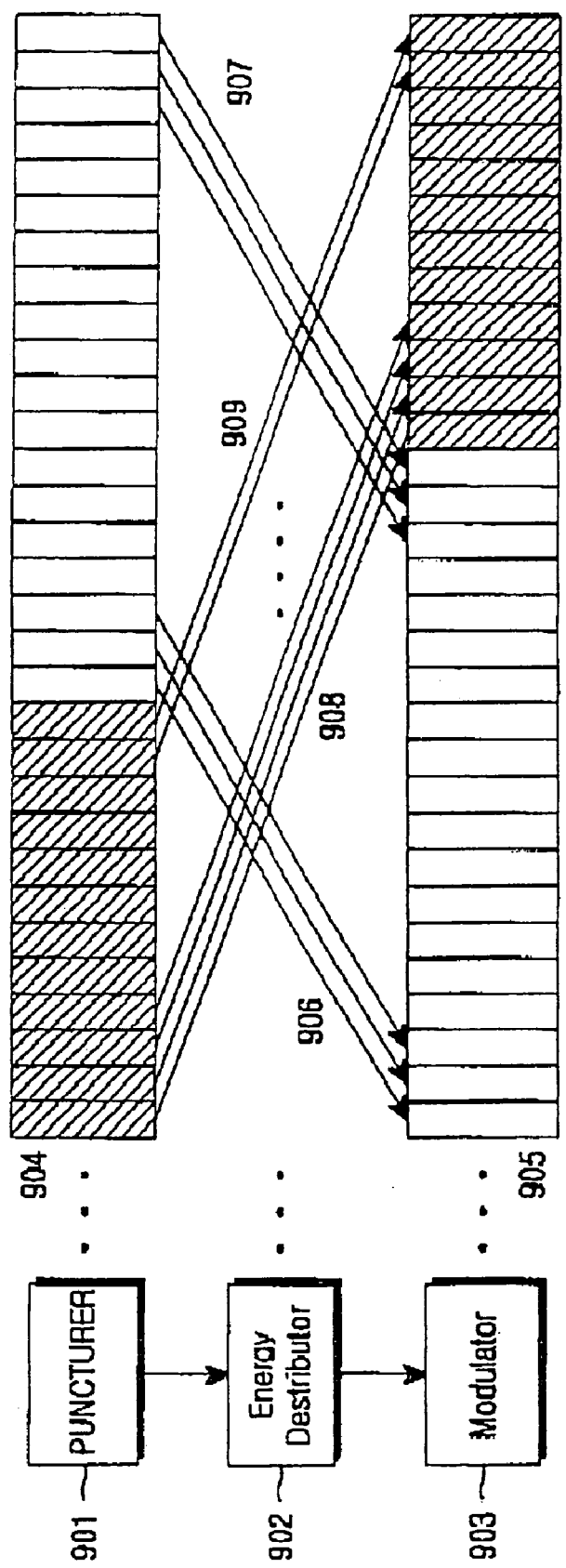
FIG. 9 illustrates symbol rearrangement for a sub-packet's transmission period in the energy distributor when a repetition factor (Repetition_Factor) for a code symbol sequence is 1 according to the embodiment of the present invention.

FIG. 9 illustrates rearrangement of symbols in a sub-packet with a Repetition_Factor=1 in the energy distributor according to the embodiment of the present invention. As stated before, if the Repetition_Factor is 1, a code symbol sequence is not repeated.

Referring to FIG. 9, reference numeral 904 denotes code symbols output from a puncturer 901. Systematic symbols are marked black and each segment in the sub-packet represents transmission of a plurality of code symbols. An energy distributor 902 controls the re-ordering of the code symbols 904 as follows. The energy distributor 902 detects the positions of parity symbols in the algorithm illustrated in FIG. 8 and feeds them to a modulator 903 in the order as denoted by reference numerals 906 and 907. After the parity symbols are all fed to the modulator 903, the energy distributor 902 detects the positions of the systematic symbols and feeds them to the modulator 903 in the order as denoted by reference numeral 908 and 909. As a result, the systematic symbols are disposed in the second part of the sub-packet's transmission period and thus transmitted with the highest energy in the sub-packet's transmission period as illustrated in FIG. 6C.

Figure 10:
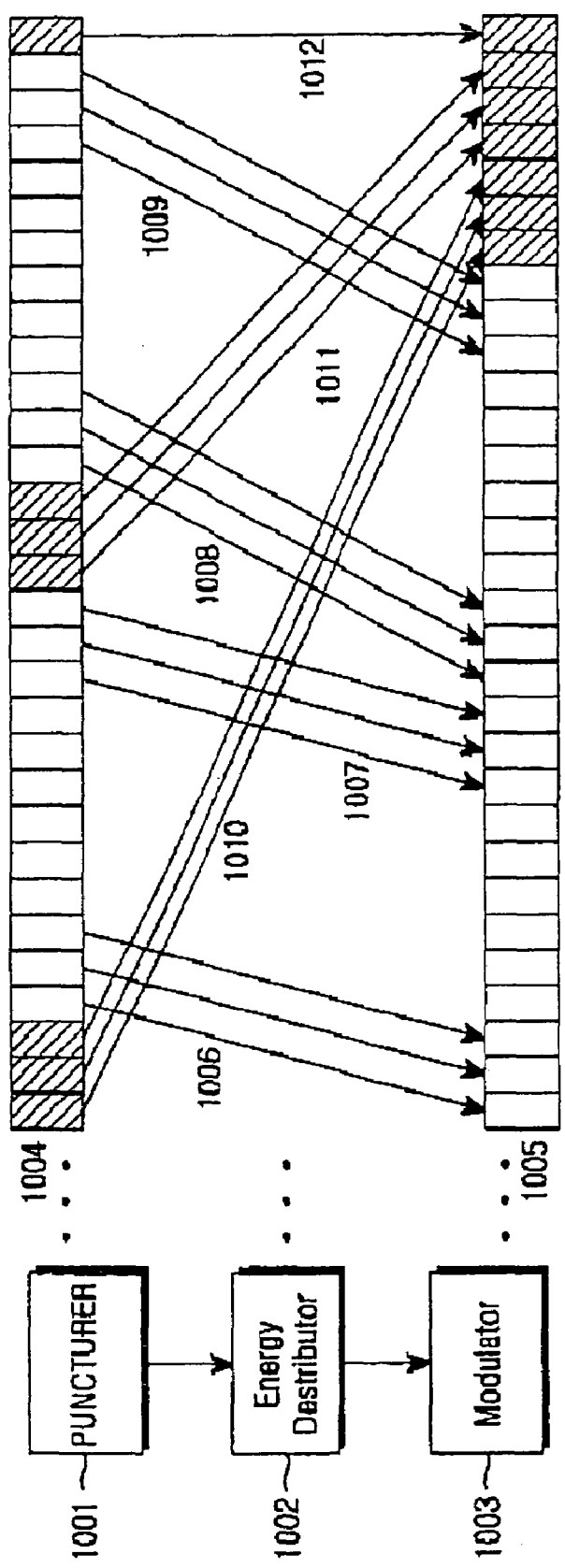
FIG. 10 illustrates symbol rearrangement for a sub-packet's transmission period in the energy distributor when the Repetition_Factor for a code symbol sequence is 3 according to the embodiment of the present invention.

FIG. 10 illustrates re-ordering symbols in a sub-packet with a Repetition_Factor=3 in the energy distributor according to the embodiment of the present invention. Referring to FIG. 10, reference numeral 1004 denotes code symbols output from a puncturer 1001. Systematic symbols are marked black and each segment in the sub-packet represents transmission of a plurality of code symbols. An energy distributor 1002 controls the re-ordering of the code symbols 1004 as follows. The energy distributor 1002 detects the positions of parity symbols in the first sequence repetition period in the algorithm illustrated in FIG. 8 and feeds them to a modulator 1003 in the order as denoted by reference numerals 1006 and 1007. Then, the energy distributor 1002 feeds parity symbols in the second and third sequence repetition periods to the modulator 1003 in the order as denoted by reference numerals 1008 and 1009, skipping systematic symbols. After all the parity symbols are fed to the modulator 1003, the energy distributor 1002 detects the positions of the remaining systematic symbols and feeds them to the modulator 1003 in the order as denoted by reference numeral 1010, 1011, and 1012. As a result, the systematic symbols are disposed in a rear portion of the sub-packet's transmission period and thus transmitted with the highest energy in the sub-packet's transmission period, as illustrated in FIG. 6C.

When code symbols output from the puncturer 505 of FIG. 5 are disposed as illustrated in FIG. 4, the reordering of the code symbols is as illustrated in FIGS. 7 to 10 in the above embodiment of the present invention. The code symbols, if they are disposed as illustrated in FIG. 3 or in any other pattern, can also be reordered so that systematic symbols are disposed in the highest energy portion of a corresponding transmission period.

Figure 11:
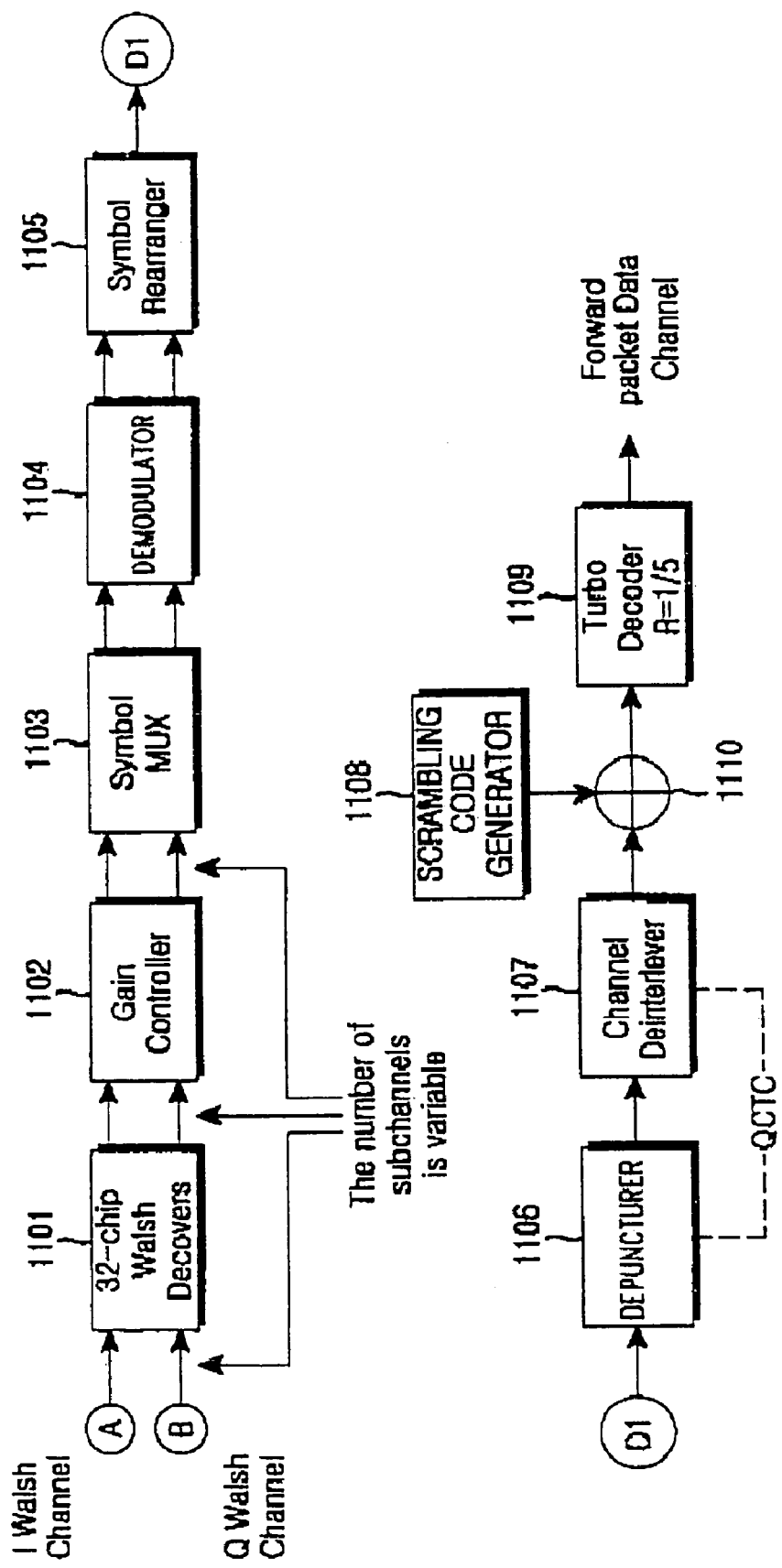
FIG. 11 is a block diagram of a receiver for receiving a F-PDCH according to the embodiment of the present invention.

FIG. 11 is a block diagram of a receiver for receiving an F-PDCH as a counterpart to the transmitter illustrated in FIG. 5 according to the embodiment of the present invention. Referring to FIG. 11, a 32-chip Walsh decover 1101 despreads an input signal with a Walsh function assigned to a PDCH. A gain controller 1102 controls the gain of the spread signal. A symbol multiplexer (MUX) 1103 multiplexes the output of the gain controller 1102. A demodulator 1104 demodulates the multiplexed signal. A symbol rearranger 1105 rearranges the modulated symbols in the reverse operation of symbol reordering in the energy distributor 506 illustrated in FIG. 5. For example, the code symbols 905 illustrated in FIG. 9 are rearranged to the code symbols 904 and the code symbols 1105 illustrated in FIG. 11 are rearranged to the code symbols 1104. A depuncturer (or a symbol inserter) 1106 depunctures the output of the symbol rearranger 1105 (or inserts symbols into the output of the symbol rearranger 1105 in a predetermined rule. A channel deinterleaver 1107 deinterleaves the output of the depuncturer 1106 in a predetermined interleaving rule. A descrambler 1110 XOR-operates a scrambling code generated from a scrambling code generator 1108 with the deinterleaved symbols. A decoder 1109 decodes the output of the descrambler 1110, thereby recovering the F-PDCH data.

Figure 12:
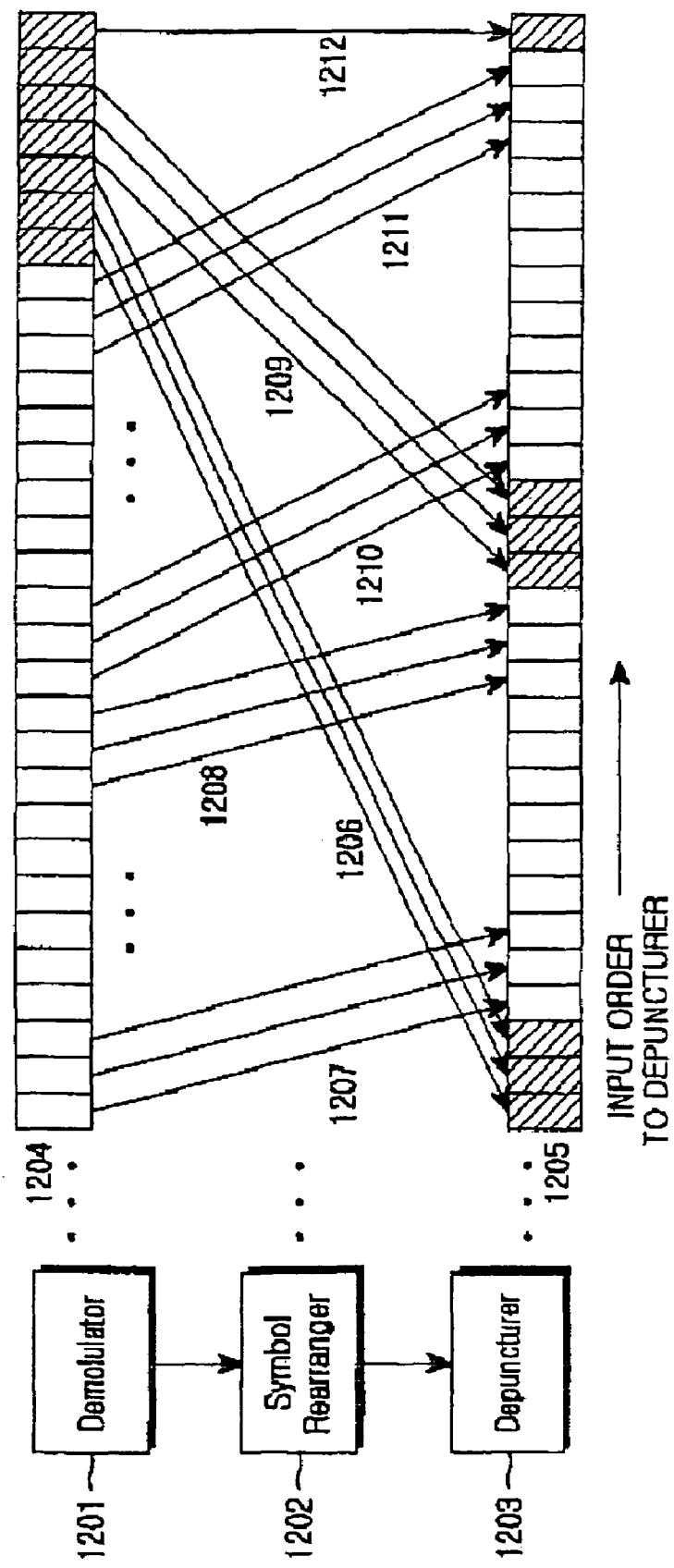
FIG. 12 illustrates symbol arrangement for a sub-packet's transmission period in the symbol rearranger illustrated in FIG. 11 according to the embodiment of the present invention.

FIG. 12 illustrates rearrangement of symbols in a sub-packet in a reverse order of symbol rearrangement illustrated in FIG. 10 in the symbol rearranger according to the embodiment of the present invention.

Referring to FIG. 12, a demodulator 1201 corresponds to the demodulator 1104, a symbol rearranger 1202 corresponds to the symbol rearranger 1105, and a depuncturer 1203 corresponds to the depuncturer 1106 shown in FIG. 11. Reference numeral 1204 denotes code symbols output from the demodulator 1201. Systematic symbols are marked black and each segment in the sub-packet represents transmission of a plurality of code symbols. The symbol rearranger 1202 generates a sequence of code symbols 1205 by changing the sequence of the code symbol sequence 1204. This is the reverse operation of the reordering of the symbols input to the modulator 507 of FIG. 5. The symbol rearranger 1202 detects systematic symbols to be disposed in the first sequence repetition period and feeds them first to the depuncturer 1203 as denoted by reference numeral 1206. Then, the symbol rearranger 1202 detects parity symbols to be disposed in the first sequence repetition period and feeds them to the depuncturer 1203 in the order as denoted by reference numerals 1207 and 1208. The symbol rearranger 1202 then detects systematic symbols to be disposed in the second sequence repetition period and feeds them to the depuncturer 1203 as denoted by reference numeral 1209. The symbol rearranger 1202 detects parity symbols to be disposed in the second sequence repetition period and feeds them to the depuncturer 1203 in the order as denoted by reference numerals 1210 and 1211. In this manner, the symbol rearranger 1202 recovers the code symbols in the original order.

Figure 13:
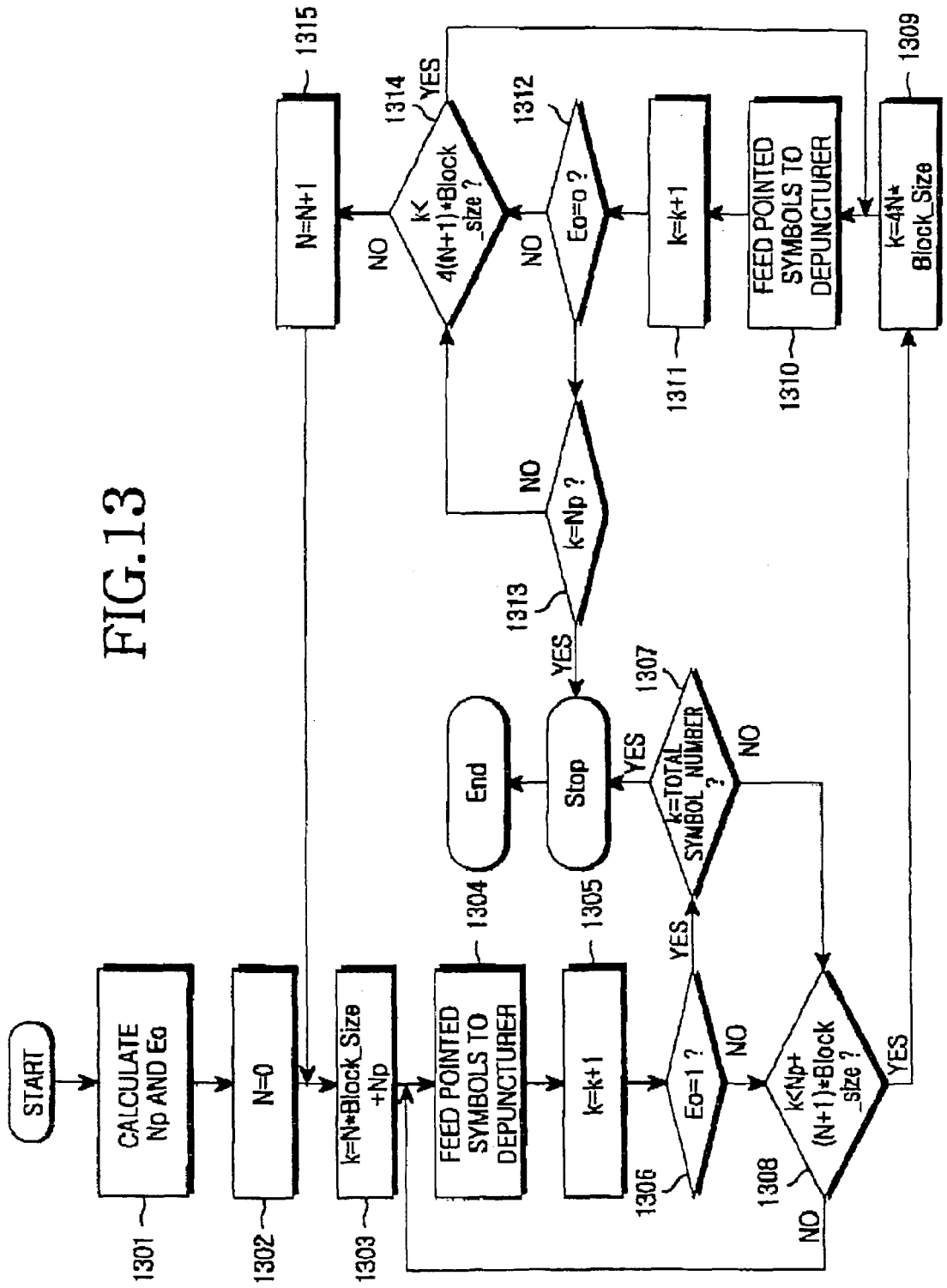
FIG. 13 is a flowchart illustrating a procedure for rearranging symbols in a sub-packet in the symbol rearranger of the receiver illustrated in FIG. 12.

FIG. 13 is a flowchart illustrating a procedure for rearranging the code symbols of a sub-packet in the symbol rearranger 1202 of the receiver for receiving an F-PDCH.

Variables used for the algorithm illustrated in FIG. 13 are calculated by:

if Repetition_Factor×5×Block_Size−(number of sub-packet code symbols)≦4×Block_Size, number of parity symbols (Np)=(number of sub-packet code symbols)−Repetition_Factor×Block_Size and End Offset(Eo)=0 else number of parity symbols (Np)=(Repetition_Factor−1)×Block_Size×4 and End Offset(Eo)=1    (2)

where a Repetition_Factor is the repetition time of a code symbol sequence and Block_Size is defined as payload length, that is, the number of information bits in one sub-packet. If Repetition_Factor is 2, a sequence repeater repeats turbo-coded symbols once. In other words, the code symbol sequence occurs twice. Here, the durations of the two symbol sequences are sequentially referred to as first and second sequence repetition periods.

Referring to FIG. 13, the symbol rearranger 1105 calculates the number Np of parity symbols in a sub-packet and a variable Eo in step 1301. If Eo is 1, it implies that the last symbol of a sub-packet to be input to the depuncturer 1203 is a systematic symbol, and if Eo is 0, it implies that the last symbol is a parity symbol. In step 1302, a variable N is set to an initial value 0 to control symbol rearrangement in the first sequence repetition period. The symbol rearranger 1105 updates a pointer k to N×Block_Size+Np in step 1303, so that the pointer k points the position of a systematic symbol in a received sub-packet, skipping parity symbols. Since N=0, the pointer k points the first systematic symbol in the first sequence repetition period. Here, 0≦k≦(number of sub-packet code symbols−1). If k=0, the pointer k points the first symbol output from the modulator 1104 and if k=x, the pointer k points the (x+1)th symbol output from the demodulator 1104. The variable N represents a sequence repetition period to which the algorithm of FIG. 13 is applied. Steps 1304 through 1308 are related to input of systematic symbols to the depuncturer 1106 and steps 1309 through 1313 are related to input of parity symbols to the depuncturer 1106.

The symbol rearranger 1105 feeds a symbol pointed by the pointer k to the depuncturer 1106 in step 1304 and increases the pointer k by one to prepare for control of feeding the next symbol in step 1305.

In step 1306, the symbol rearranger 1105 checks the variable Eo. If Eo is 1, the symbol rearranger 1105 proceeds to step 1307 and if Eo is not 1, it goes to step 1308. In step 1307, the symbol rearranger 1105 determines whether the variable k is equal to the total number of code symbols, that is, all the systematic symbols of the sub-packet have been fed to the depuncturer 1106. If all the systematic symbols have been fed to the depuncturer 1106, the algorithm ends and otherwise, the symbol rearranger 1105 goes to step 1308.

The symbol rearranger 1105 compares the variable k with Np+(N+1)×Block_Size, that is, determines whether the systematic symbols of the sequence repetition period indicated by the variable N have been all fed to the depuncturer 1106 in step 1308. If the systematic symbols have all been fed to the depuncturer 1106, the symbol rearranger 1105 proceeds to step 1309 to control input of the parity symbols of the sequence repetition period indicated by the variable N to the depuncturer 1106. If systematic symbols to be input to the depuncturer 1106 remain, the symbol rearranger 1105 returns to step 1304.

In step 1309, the symbol rearranger 1105 updates the variable k to 4N×Block_Size so that the pointer k points the first parity symbol in the sequence repetition period indicated by the variable N. Then, the symbol rearranger 1105 feeds the pointed parity symbol to the depuncturer 1106 in step 1310 and increases the variable k by one to point the next symbol in step 1311. In step 1312, the symbol rearranger 1105 determines whether the variable Eo is 0. If Eo is 0, the symbol rearranger 1105 goes to step 1313 and if it is not 0, the symbol rearranger 1105 goes to step 1314. In step 1313, symbol rearranger 1105 determines whether k is equal to Np. If all the parity symbols of the sub-packet are fed to the depuncturer 1106, the algorithm ends and if there remain parity symbols to be input to the depuncturer 1106, the symbol rearranger 1105 proceeds to step 1314.

In step 1314, the symbol rearranger 1105 determines whether k is less than 4(N+1)×Block_Size, that is, determines whether all the parity symbols of the sequence repetition period indicated by the variable N have been fed to the depuncturer 1106. If parity symbols to be input to the depuncturer 1106 remain, the symbol rearranger 1105 feeds the symbol pointed by the variable k to the depuncturer 1106 in step 1310. If all the parity symbols of the corresponding sequence repetition period have been fed to the depuncturer 1106, the symbol rearranger 1105 increases the variable N by one to control input of the symbols of the next sequence repetition period to the depuncturer 1106 in step 1315. After performing step 1315, the symbol rearranger 1105 returns to step 1303.

As described above, the energy distributor outputs parity symbols first among symbols received from the puncturer to the modulator and then the remaining information symbols, so that the systematic symbols are disposed in the second part of a sub-packet's transmission period having the highest transmission energy.

It can be further contemplated as another embodiment that the energy distributor simply outputs the symbols received from the puncturer to the modulator in a reverse order of input to implement the energy distribution according to the present invention. In this case, the energy distributor need not know the positions of parity symbols in a symbol sequence and can avoid assignment of excess energy to the systematic symbols, thereby increasing performance further.

Hardware blocks according to another embodiment of the present invention are configured in the same manner as illustrated in FIG. 5, except that the energy distributor operates differently. The energy distributor sequentially stores a sequence of symbols received from the puncturer 505 and outputs them in a reverse order to the modulator 507. The operation of the energy distributor will be described in detail hereinbelow.

Figure 14:
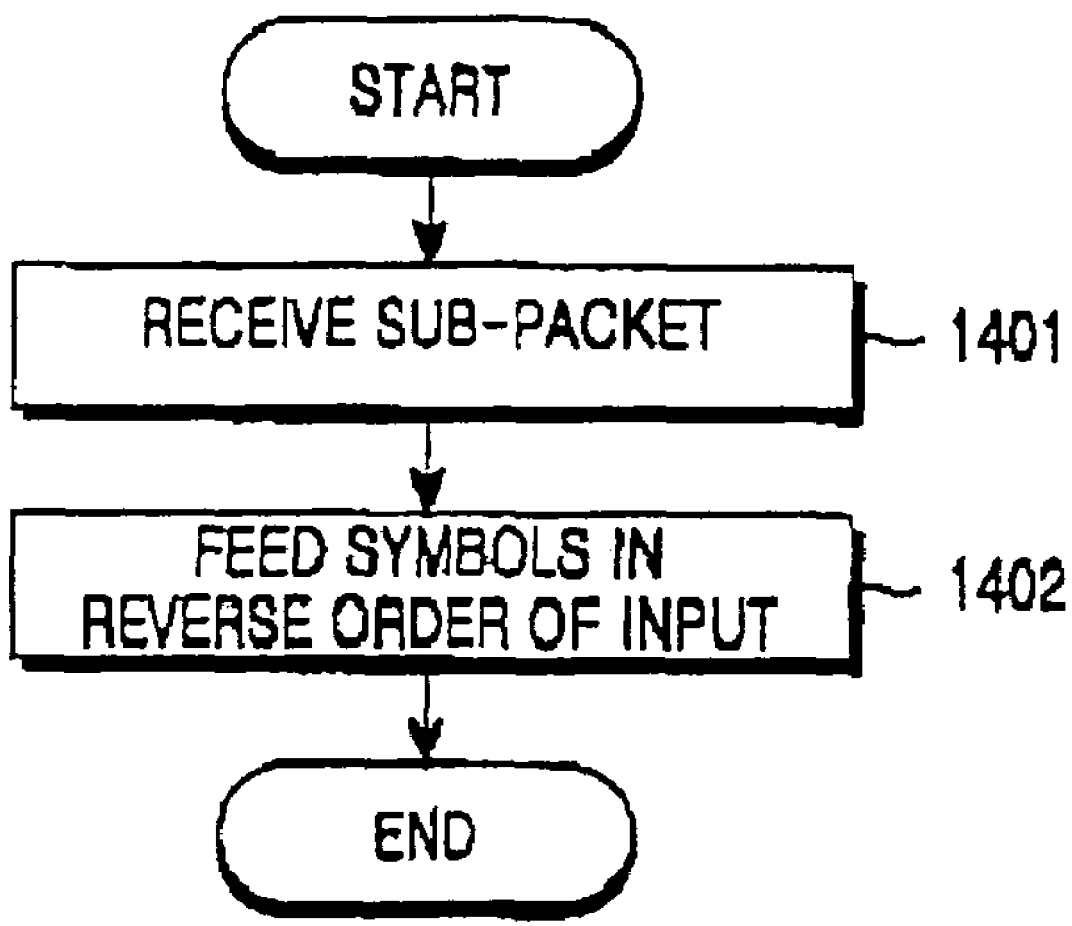
FIG. 14 illustrates symbol rearrangement in a reverse order of input in the energy distributor according to another embodiment of the present invention.

FIG. 14 is a flowchart illustrating a procedure for rearranging symbols in a reverse order of input in the energy distributor to the second embodiment of the present invention. Referring to FIG. 14, the energy distributor receives the code symbols of a sub-packet to be transmitted on a PDCH from the puncturer 505 illustrated in FIG. 5 in step 1401. The code symbols include systematic symbols and parity symbols produced from turbo-encoding PDCH data. In step 1402, the energy distributor feeds the code symbols in a reverse order of input to the modulator 507. In other words, the energy distributor stores symbols received from the puncturer 505 and reads them from the end, so that the systematic symbols are assigned to more energy. The reason why outputting the symbols simply in a reverse order of input instead of disposing the systematic symbols in a high energy period portion as illustrated in FIG. 7, is to prevent assignment of excess energy to the systematic symbols which could take place when the systematic symbols are concentrated at the end of the transmission period. Another advantage with the reverse-order outputting is implementation simplicity.

Figure 15:
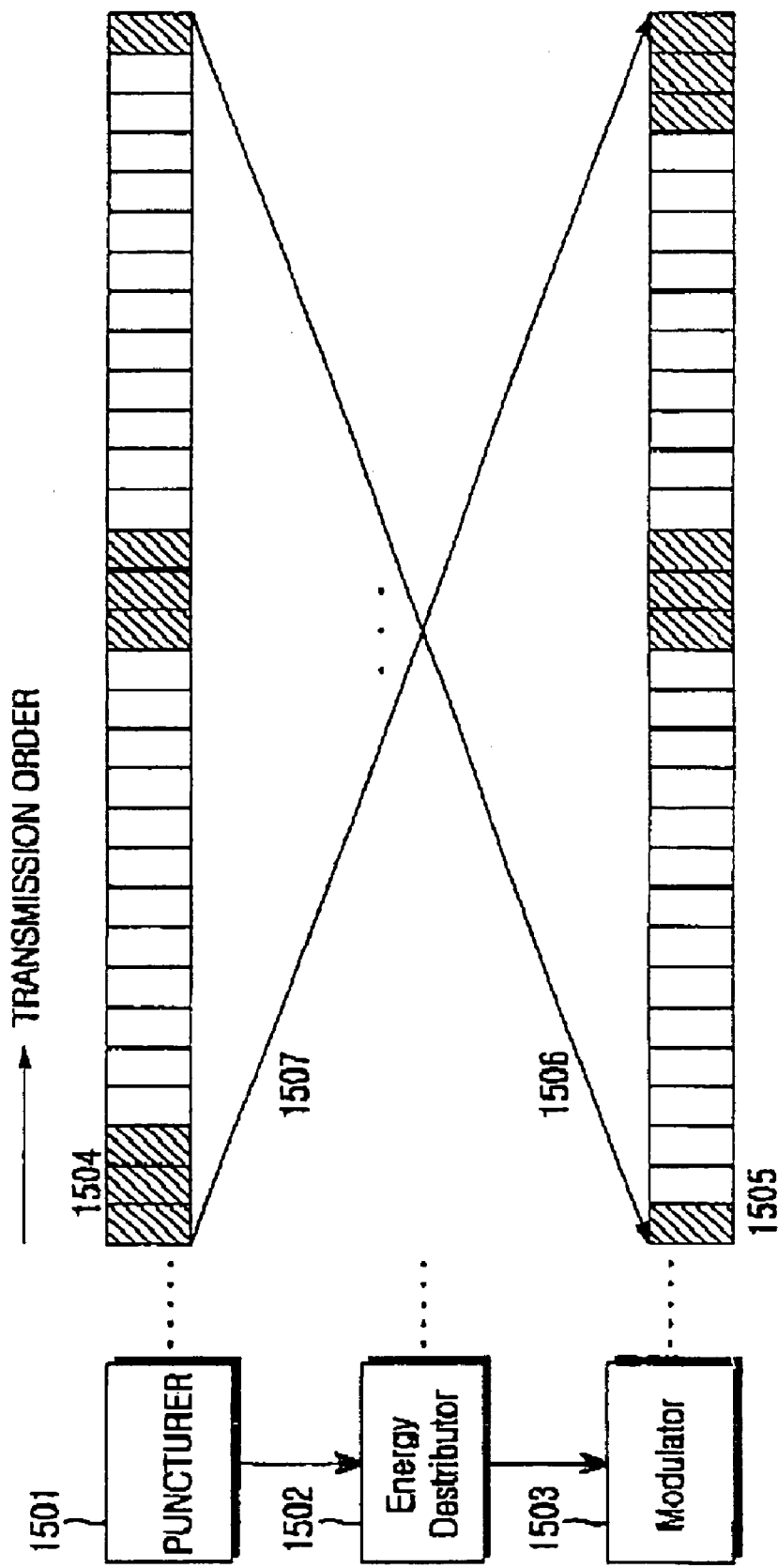
FIG. 15 illustrates symbol rearrangement within a sub-packet in a reverse order of input in the energy distributor when the Repetition_Factor is 3 according to the second embodiment of the present invention.

FIG. 15 illustrates symbol rearrangement in the energy distributor when Repetition_Factor is 3 according to the second embodiment of the present invention. Referring to FIG. 15, a puncturer 1501 corresponds to the puncturer 505 of FIG. 5, an energy distributor corresponds to the energy distributor 506, and a modulator 1503 corresponds to the modulator 507. Reference numeral 1504 denotes symbols output from the puncturer 1501. Systematic symbols are marked with oblique lines. Each segment in the transmission period represents transmission of a plurality of symbols in a sub-packet. The energy distributor 1502 outputs received symbols in a reverse order of input to the modulator 1503. The last input symbol is first fed to the modulator 1503 as indicated by reference numeral 1506 and the first input symbol are the last to be fed to the modulator 1503 as indicated by reference numeral 1507.

As illustrated in FIG. 15, more systematic symbols are disposed in the first part of the transmission period than in the second part. The reverse-order symbol outputting reverses the symbol disposition pattern. Thus, more systematic symbols are disposed in the second part having more energy than in the first part of the transmission period.

It is to be noted in the above description of the present invention that the symbol rearrangement can be implemented in the puncturer and the recovery of symbols in the original order can also be realized with the depuncturer.

In accordance with the present invention as described above, if energy (or power) assigned to a PDCH transmitting a sub-packet is changed for its transmission period in a high-rate packet transmission mobile communication system, the symbols of the sub-packet are rearranged so that more energy is assigned to more significant symbols (or bits) to improve data reception performance. Therefore, data reception throughput (or decoding performance) can be improved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for receiving a sequence of systematic symbols and a sequence of parity symbols in a mobile communication system in which a turbo encoder generates the systematic symbol sequence and the parity symbol sequence by encoding an information bit stream, and the parity symbol sequence precedes the systematic symbol sequence in transmission for a predetermined transmission period, the apparatus comprising:

a despreader for generating modulation symbols by despreading a signal received for the transmission period;

a demodulator for demodulating the modulation symbols and generating a sequence of code symbols;

a symbol rearranger for outputting systematic symbols disposed in a second part of the code symbol sequence and then outputting the remaining parity symbols disposed in a first part of the code symbol sequence; and a decoder for generating an information bit stream by turbo-decoding the rearranged symbol sequence.

2. An apparatus for receiving a sequence of systematic symbols and a sequence of parity symbols in a mobile communication system in which a turbo encoder generates the systematic symbol sequence and the parity symbol sequence by encoding an information bit stream, the systematic symbol sequence and the parity symbol sequence are serially concatenated, and the serially concatenated are transmitted in a reverse order for a predetermined transmission period, the apparatus comprising:

a despreader for generating modulation symbols by despreading a signal received for the transmission period;

a demodulator for demodulating the modulation symbols and generating a sequence of code symbols;

a symbol rearranger for outputting the code symbol sequence in a reverse order; and a decoder for generating an information bit stream by turbo-decoding the rearranged symbol sequence.

3. A method of receiving a sequence of systematic symbols and a sequence of parity symbols in a mobile communication system in which a turbo encoder generates the systematic symbol sequence and the parity symbol sequence by encoding an information bit stream and the parity symbol sequence precede the systematic symbol sequence in transmission for a predetermined transmission period, the method comprising the steps of:

generating modulation symbols by despreading a signal received for the transmission period;

demodulating the modulation symbols and generating a sequence of code symbols;

outputting systematic symbols disposed in a second part of the code symbol sequence and then outputting the remaining parity symbols disposed in a first part of the code symbol sequence; and generating an information bit stream by turbo-decoding the rearranged symbol sequence.

4. A method of receiving a sequence of systematic symbols and a sequence of parity symbols in a mobile communication system in which a turbo encoder generates the systematic symbol sequence and the parity symbol sequence by encoding an information bit stream, the systematic symbol sequence and the parity symbol sequence are serially concatenated, and the serially concatenated are transmitted in a reverse order for a predetermined transmission period, the method comprising the steps of:

generating modulation symbols by despreading a signal received for the transmission period;

demodulating the modulation symbols and generating a sequence of code symbols;

outputting the code symbol sequence in a reverse order; and generating an information bit stream by turbo-decoding the rearranged symbol sequence.

* * * * *